Dec. 12, 1933.   G. F. CAVANAGH ET AL   1,939,293
METHOD OF MAKING FLOOR COVERINGS
Filed Sept. 5, 1930   2 Sheets-Sheet 1
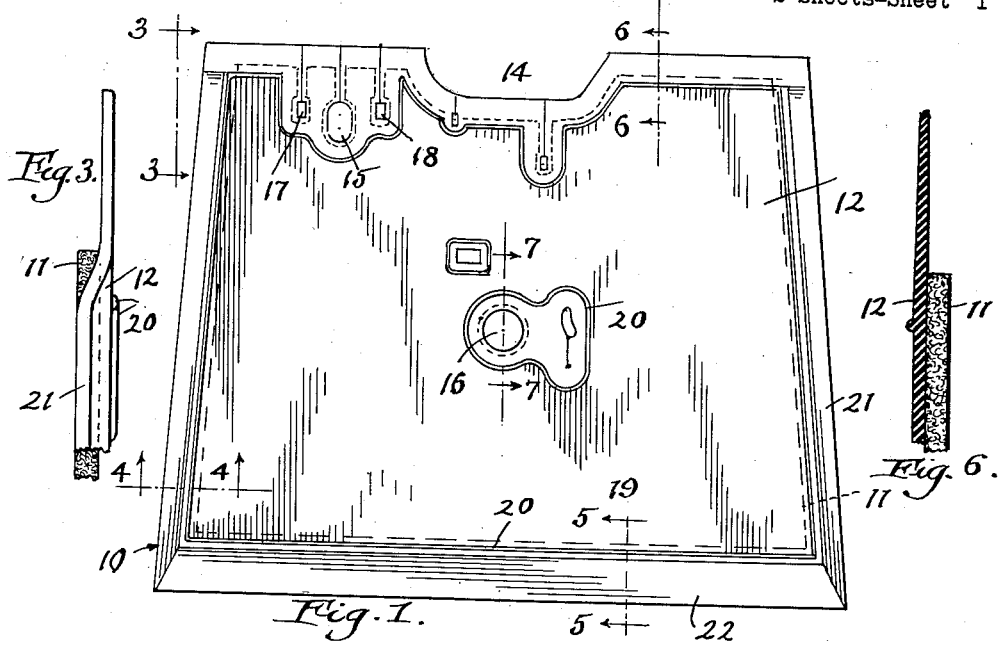
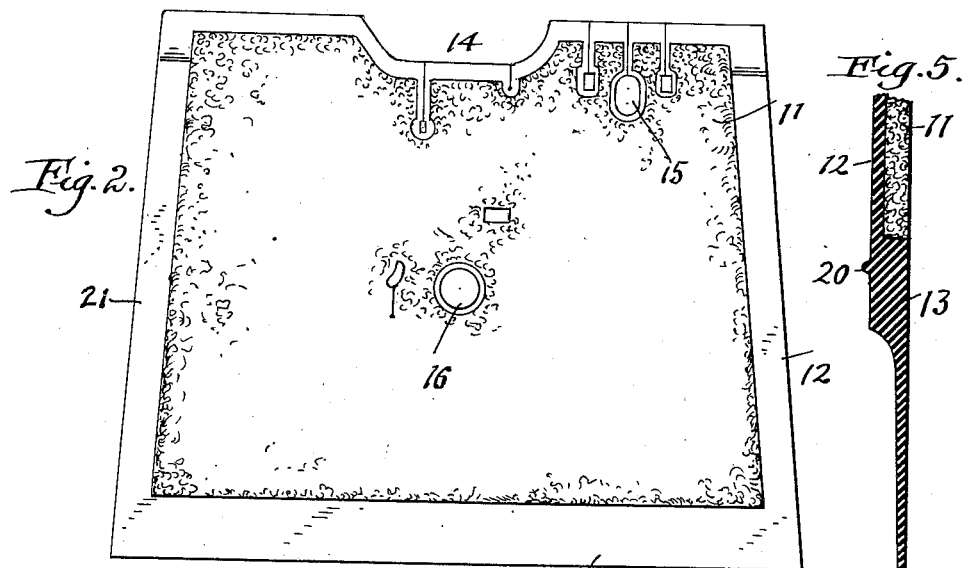
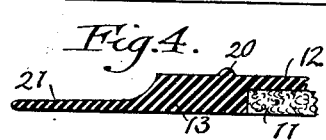
Inventors.
Gerald F. Cavanagh
Albert B. Schultz
Kerr Hudson & Kent
attys

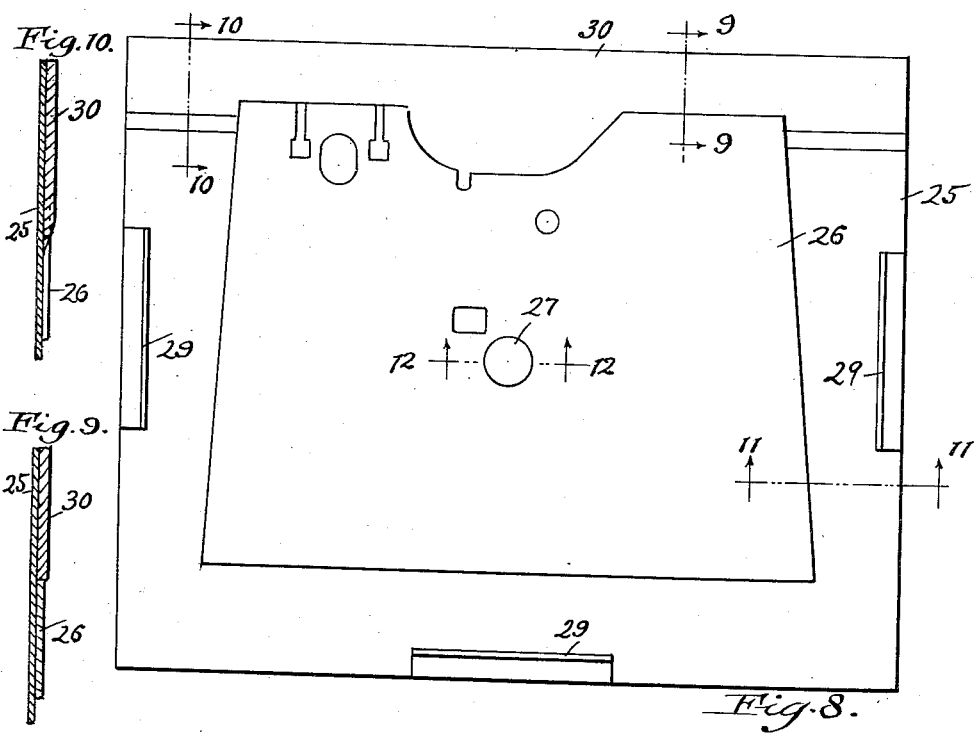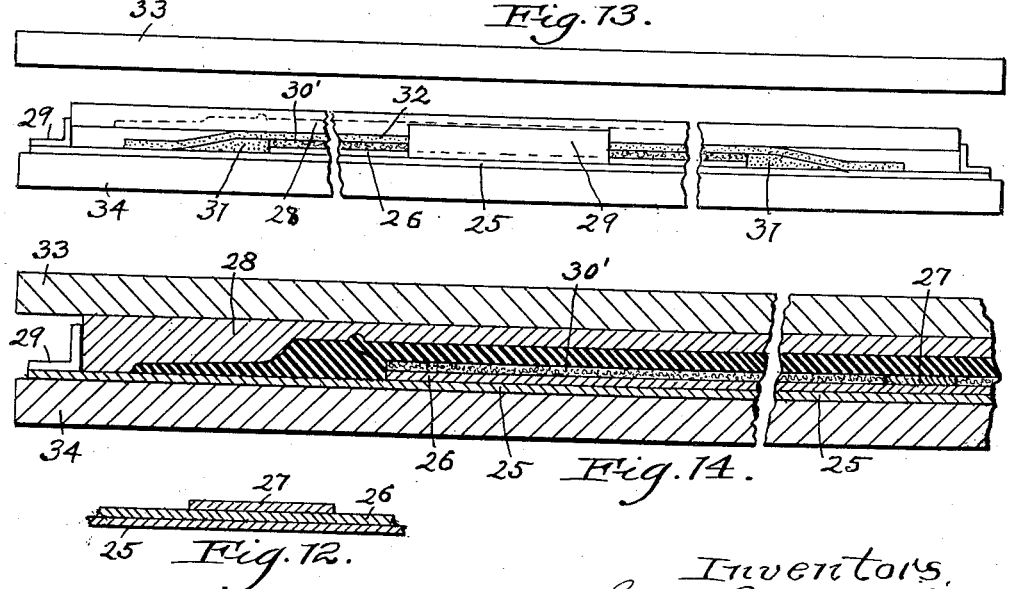

Patented Dec. 12, 1933

1,939,293

UNITED STATES PATENT OFFICE 1,939,293

METHOD OF MAKING FLOOR COVERINGS

Gerald F. Cavanagh, Cleveland, and Albert B. Schultz, Willoughby, Ohio, assignors to The Ohio Rubber Company, Cleveland, Ohio, a corporation of Ohio Application September 5, 1930
Serial No. 479,888

4 Claims. (Cl. 154—2)

This invention relates to a composite rubber and fiber floor covering and to a novel method for making such coverings.

As an object of this invention we aim to provide an improved form of composite rubber and fiber floor covering.

Another object of our invention is to provide a novel method for making composite rubber and fiber floor coverings.

The invention may be further briefly summarized as consisting in certain novel steps of procedure, and in certain novel combinations and arrangements of parts, hereinafter described and particularly set out in the appended claims.

In the accompanying sheets of drawings,

Figure 1 is a top plan view showing a composite rubber and fiber floor covering constructed according to our invention.

Fig. 2 is a bottom plan view thereof.

Fig. 3 is a partial side elevation thereof looking in the direction indicated by line 3—3 of Fig. 1.

Fig. 4 is a sectional elevation taken on line 4—4 of Fig. 1.

Fig. 5 is a sectional elevation taken on line 5—5 of Fig. 1.

Fig. 6 is a sectional elevation taken on line 6—6 of Fig. 1.

Fig. 7 is a sectional elevation taken on line 7—7 of Fig. 1.

Fig. 8 is a top plan view of the bottom mold member used in carrying out our method.

Fig. 9 is a sectional elevation taken on line 9—9 of Fig. 8.

Fig. 10 is a sectional elevation of the mold member taken in the direction indicated by line 10—10 of Fig. 8.

Fig. 11 is a sectional elevation taken on line 11—11 of Fig. 8.

Fig. 12 is a sectional elevation taken on line 12—12 of Fig. 8.

Fig. 13 is a side elevational view showing the mold members and material in assembled position ready for the closing of the vulcanizing press, and Fig. 14 is a sectional view showing the relative positions of the materials and mold members during the vulcanizing operation.

In disclosing the composite felt and rubber floor covering of our invention, and our novel method for making the same, we have shown a floor mat 10 designed for the front compartment of a motor vehicle, but it should be understood that this showing is illustrative only since our composite covering may be used on floors in general, on stair treads, or for like purposes. This vehicle floor mat, as shown in Figs. 1 and 2 of the drawings, comprises a resilient layer or sheet 11 of fibrous material, such as a layer of felt, and a covering of soft flexible rubber 12 secured thereto. The layer of felt forms a yielding cushion which gives the mat some of the characteristics of a carpet-like floor covering. In addition, this layer of felt serves as an insulation which retards the transfer of heat and objectionable noises through the floor of the vehicle. The rubber covering protects the layer of felt, and gives the mat a neat and smooth tread surface, which is very durable and which can be readily cleaned without damage to the layer of felt.

The desirable characteristics of composite felt and rubber floor mats are well known, but as heretofore constructed the rubber covering has not provided sufficient protection for the layer of felt to enable the latter to efficiently fulfill its functions. This is especially true of vehicle floor mats as heretofore constructed, since in such mats the rubber covering usually has a tendency to curl up along the edges and to expose the layer of felt. This layer of felt is usually formed of loosely compacted fibers so as to have the desired cushioning effect, and when exposed or insufficiently protected, rapidly disintegrates, resulting in the scattering of dust and loose fibers about the compartment, and in the loss of the cushion-like characteristic of the mat.

To provide the maximum protection for the layer of felt, and to secure the same to the rubber covering so that the fibers will not become loosened, we vulcanize the rubber to the felt, and during the vulcanizing operation mold the rubber to form the continuous thickened marginal portions 13 along the side and rear edges of the mat. These thickened portions extend downwardly and form protective shoulders for the edges of the layer of fiber, and also serve as a retaining means, which holds the layer of fiber to its original shape and thickness. These thickened portions also strengthen the mat around the edges thereof, and increase the stiffness of the rubber covering at these points, so that the mat will lie flat, and all tendency for the rubber covering to curl up and expose the felt will be eliminated.

The vehicle floor mat may be constructed in any desired shape, or to any desired proportions, and as illustrated in Figs. 1 and 2, has substantially the outline of the vehicle compartment. The thickened edge portion may be extended around all four edges of the mat, but we prefer to provide it only along those edges which are subjected to most wear, namely, the side and rear edges. Along the front edge, or, in other words, along the edge of the mat which is toward the front of the vehicle, we omit the thickened portion and extend the rubber covering beyond the edge of the layer of fiber, as clearly indicated in Fig. 6.

The mat may be formed with a suitable recess 14 along the forward edge thereof to fit around that portion of the dash which is extended rearwardly into the front compartment to accommodate the motor block. At suitably located points, openings of proper shape are provided through the rubber covering and through the felt to accommodate the passage of various vehicle controls, such as the openings 15 and 16 which accommodate, respectively, the steering column and the transmission lever, and the openings 17 and 18 which accommodate, respectively, the clutch and brake pedals. It will be noted that in providing these openings for the control members, the layer of felt is stopped short of the opening through the rubber, so that the layer of felt will not be subjected to wear at these points which would result in fibers of the felt being projected through these openings to interfere with the operation of the controls, and to give the mat an undesirable appearance.

If desired, during the molding and vulcanizing operation the rubber covering may be given a suitable pattern or surface configuration, such as the rib pattern 19 indicated in Fig. 1. Likewise, if desired, a raised and rounded bead 20 may be provided as a decorative border near the edges of the rubber covering and around the control openings. Along the side and rear edges of the mat we prefer to extend the rubber covering beyond the thickened portion to form the flexible flaps 21 and 22, respectively, which are of tapered thickness. These tapered flaps increase the tendency for the edge portions of the mat to hug, or lie flat upon the vehicle floor, and in addition, they improve the appearance of the mat and facilitate the fitting thereof to the vehicle compartment.

In constructing our mat, as already stated, we vulcanize the rubber covering to the felt, and during the vulcanizing operation we mold the rubber to form the thickened protective edges 13. In order to mold these thickened portions, and to enable the vulcanizing press to exert sufficient pressure against the rubber of the covering to vulcanize the same to the felt and to mold the decorative pattern on the tread surface of the rubber, we employ a bottom mold member of peculiar construction, which is illustrated in Fig. 8. This mold member comprises a bottom plate 25 having a mold plate 26 secured thereto which has substantially the same outline as the layer of felt, and which compresses the felt during the vulcanizing operation. At points on the surface of the mold plate 26 corresponding with the location of the control openings, we provide suitably shaped plate members 27 of the same size as the corresponding openings in the felt. The thickness of these plate members is substantially equal to the thickness to which the layer of felt is compressed during the vulcanizing operation, so that they take the place of the portions of the layer of felt which have been cut out to form the control openings.

In conjunction with the bottom mold member 25 we employ a suitable top mold member 28, which is preferably constructed of hard vulcanized rubber, reinforced with fabric, and which has the under surface thereof shaped to provide the molding face which contacts with, and molds the rubber covering. For positioning the top mold member with respect to the bottom mold member the latter is preferably provided with suitable locating members, such as the clips 29 secured thereto.

Along the edge of the bottom mold member corresponding with the forward edge of the mat which extends beyond the felt and which does not have the thickened rubber covering, we provide the metal strip or plate 30. This plate, as clearly shown in Figs. 9 and 10, has sufficient thickness to compensate for the omission of the felt along this edge of the mat, and during the vulcanizing operation this plate exerts pressure against the underside of the rubber covering.

In carrying out our method the material and mold members are assembled before the vulcanizing operation in substantially the arrangement shown in Fig. 13. In assembling the mold members and material in this arrangement, a layer of felt 30' of suitable shape and size, and having control openings therein, is laid upon the mold plate 26 of the bottom mold member, with the plate members 27 extending into the control openings of the layer of felt. Strips 31 of uncured rubber are laid along the edges of the layer of felt, as indicated in Fig. 13, to provide the additional rubber stock required in forming the thickened portions 13. A continuous sheet of uncured rubber 32 of suitable size is laid to extend over the layer of felt and over the strips of uncured rubber 31. The top mold member 28 is then placed upon the sheet of uncured rubber with the edges of the top mold member adjacent the locating clips 29. The assembly thus formed, comprising top and bottom mold members with the materials therebetween, is inserted as a unit between the pair of cooperating upper and lower platens 33 and 34 of the vulcanizing press. The platens are then moved toward each other to apply heat and pressure required for the curing and molding of the rubber. During this vulcanizing operation the mold members and materials are in substantially the positions illustrated in Fig. 14 of the drawings. It will be seen from this figure that during the vulcanizing operation the mold plate 26 compresses the layer of felt upwardly against the rubber covering, to thereby exert sufficient pressure against the felt and rubber to secure a firm union therebetween, and also to exert sufficient pressure against the rubber, so that the same will be properly vulcanized and the desired pattern molded thereon. In addition to its function of exerting pressure against the rubber through the layer of felt, the edge surfaces of the mold plate 26 cooperate with the upper mold member 28 to shape and mold the thickened edge portions 13. The molding of the thickened edge portions in this manner results in the formation of the shallow recess in the under surface of the rubber covering in which the layer of felt is secured.

After the rubber covering has been molded and secured to the layer of felt by the vulcanizing and molding operation just described, it is necessary to treat the layer of felt to expand the same and thereby restore its resiliency. We have found that the resiliency of the felt can best and most practically be restored by steaming the same. The steaming of the felt does not in any way injure the rubber covering, and yet causes the felt to be expanded so that it will have substantially the same thickness and resiliency as before the vulcanizing operation.

After the steaming operation the rubber covering is trimmed to the desired dimensions, and the openings 15, 16, 17 and 18 and the like, are cut through the rubber.

It will now be readily seen that I have provided an improved form of mat construction, in which the rubber covering vulcanized to the layer of felt is provided with thickened edge portions which protect the felt and confine the same against fraying and stretching. This thickened edge and tapering flange extending therefrom cause the edges of the mat to lie flat against the floor at all times. It will also be readily understood that we have provided a novel method for making composite felt and rubber mats, such as the one which we have shown and described in detail.

Throughout the specification and claims we have referred to the layer of resilient material as a layer of "felt", and by this term we mean any of the sheets or mats of loosely compacted fibers commonly known as felt, regardless of whether the fibers are of animal, vegetable or mineral origin, and regardless of whether the fibers are stitched to, or otherwise attached to, a reinforcing layer of burlap or the like.

While we have illustrated and described the method and article of our invention in a detailed manner, it should be understood, however that we do not propose to limit ourselves to the precise details, arrangements, and steps of procedure described, but regard our invention as including such changes and modifications as do not involve a departure from the spirit of the invention and the scope of the appended claims.

Having thus described our invention, we claim:

1. The method of making composite fiber and rubber articles which comprises vulcanizing a sheet of rubber to a layer of fiber by pressing said layer against the rubber with a member having substantially the outline of the layer, and simultaneously uniting strip rubber stock to said sheet by vulcanization and molding the strip stock along an edge of said member to form a shoulder coextensive with an edge of said layer.

2. The method of making a composite felt and rubber floor covering which comprises applying a layer of felt to a relatively elevated portion of a mold member, placing uncured rubber adjacent said layer, and then subjecting the felt and the rubber to vulcanizing pressure whereby the rubber is attached to the felt and is molded around the relatively elevated portion to thereby provide a recess for the felt, which encloses the peripheral edge of the felt.

3. The method of making a composite fiber and rubber floor covering which comprises exerting vulcanizing pressure against a layer of fiber and uncured rubber covering therefor whereby the layer of fiber is secured to the rubber and is compressed into a recess molded in the rubber covering, and then treating the fiber to restore its thickness to substantially the depth of the recess.

4. The method of making a floor covering of the type having a molded tread portion and a fibrous backing portion which comprises exerting molding pressure against a layer of fibrous backing material and a layer of moldable tread forming material in contact with each other whereby the fibrous layer is united with the tread forming material and is compressed into a recess simultaneously molded in the tread forming material, and then treating the fibrous layer to restore its thickness to substantially the depth of the recess.

GERALD F. CAVANAGH.
ALBERT B. SCHULTZ.